United States Patent [19]

Watanabe

[11] Patent Number: 4,666,020
[45] Date of Patent: May 19, 1987

[54] CONTROL APPARATUS FOR ELEVATOR

[75] Inventor: Eiki Watanabe, Inazawa, Japan

[73] Assignee: Mitsubishi Denki Kabushiki Kaisha, Tokyo, Japan

[21] Appl. No.: 854,100

[22] Filed: Apr. 21, 1986

[30] Foreign Application Priority Data

Apr. 22, 1985 [JP] Japan .................................. 60-86111

[51] Int. Cl.$^4$ .............................................. B66B 1/30
[52] U.S. Cl. ........................................ 187/114; 307/64; 307/66; 318/801; 318/802; 363/37; 363/41
[58] Field of Search ................. 187/29 R; 307/64, 66; 318/801, 802, 803, 810, 811; 363/34, 37, 38, 64, 66, 41, 124, 125, 126, 127, 129

[56] References Cited

U.S. PATENT DOCUMENTS 4,354,223 10/1982 Turnbull ............................ 363/41 X
4,445,167 4/1984 Okado ............................... 363/41 X
4,620,272 10/1986 Fulton et al. .................... 363/126 X

FOREIGN PATENT DOCUMENTS 59-102779 6/1984 Japan .

Primary Examiner—William M. Shoop, Jr.
Assistant Examiner—Richard K. Blum
Attorney, Agent, or Firm—Leydig, Voit & Mayer

[57] ABSTRACT

An elevator wherein an electric motor for driving the cage of the elevator is driven by the use of alternating current produced by an inverter, comprising a converter which feeds D.C. power to the inverter and which is so arranged that a plurality of transistors are connected into a bridge corresponding to the number of phases of an A.C. power source connected on the input side of the converter and that diodes are connected to the respective transistors in inverse parallel relationship. In addition, a battery to be used in emergency is connected on the input side of the converter. The converter is controlled in the pulse width modulation in the normal state of the A.C. power source, and the converter connected to the battery is controlled as a chopper during the stoppage of the power source, thereby making it possible to run the elevator at high speed even with the battery of low voltage.

6 Claims, 4 Drawing Figures

CONTROL APPARATUS FOR ELEVATOR

BACKGROUND OF THE INVENTION

This invention relates to a control apparatus for an elevator in which a sinusoidal wave converter is used as a step up chopper during the stoppage of power supply, whereby a D.C. voltage twice as high as that in a prior art can be applied to an inverter so as to achieve a speed double that of the prior art with an accumulator of low voltage.

FIG. 4 is a circuit diagram showing the prior-art control apparatus for an elevator disclosed in the official gazette of Japanese Patent Application Laid-open No. 59-102770. Referring to this figure, letters R, S and T indicate the respective phases of a three-phase A.C. power source, which are connected through normally-open contacts 6a-6c and reactors 8a-8c to the input ends of a three-phase bridge rectifier circuit (hereinbelow, simply termed "rectifier circuit") which is constructed of diodes 1a-1f. The normally-open contacts 6a-6c are the normally-open contacts of a contactor (not shown) which is energized while the power source is normal.

A series circuit consisting of a normally-closed contact 7a and a battery BAT is connected across the input ends of the S-phase and T-phase of the rectifier circuit. The normally-closed contact 7a is the normally-closed contact of a contactor (not shown) which is deenergized while the power source stops.

Connected across the plus side and minus side output ends of the rectifier circuit are a smoothing capacitor 3, and a series circuit consisting of a resistor 4 and a transistor 5. This series circuit is for consuming regenerative power in the regenerative mode of operation.

In addition, the plus side output end and minus side output end of the rectifier circuit are connected to the input ends of an inverter in which power transistors 2a-2f and corresponding diodes are respectively connected in inverse parallel relationship. The output ends of the inverter are connected to a three-phase A.C. motor IM. The cage of the elevator, not shown, is driven by the three-phase A.C. motor IM.

Next, the operation of the prior-art apparatus will be described. While the elevator is run with the normal power supply, the normally-open contacts 6a-6c are closed, and the normally-closed contact 7a is open. Under this state, A.C. electric power from the three-phase A.C. power source R, S, T is fed to the rectifier circuit through the normally-open contacts 6a-6c as well as the reactors 8a-8c and is converted by the diodes 1a-1f into direct current, which is smoothed by the capacitor 3.

The D.C. electric power thus rectified and smoothed is applied to the inverter. This inverter applies alternating current of any desired voltage and any desired frequency (variable voltage and variable frequency) to the three-phase A.C. motor IM through the well-known pulse width modulation (PWM), whereupon the three-phase A.C. motor IM drives the cage (not shown) as specified by a speed command value.

On the other hand, when the power supply has stopped, the normally-open contacts 6a-6c are opened, and the normally-closed contact 7a is closed. Thus, the voltage of the battery BAT is applied across the A.C. input sides of the S-phase and T-phase of the rectifier circuit through the normally-closed contact 7a.

The voltage of the battery BAT is applied to the inverter, which drives the three-phase A.C. motor IM through the PWM control similarly to the foregoing.

During the stoppage of the power supply, however, the voltage of the battery BAT is lower than that of the normal power supply. When it is intended to forcibly raise the battery voltage, a large number of batteries must be connected in series, which is uneconomical. In general, therefore, the voltage of the battery BAT is set at several tenths of the voltage of the normal power supply, and the running speed of the cage is also lowered to several tenths in conformity with the set voltage, so that a high speed operation cannot be performed.

The rectifier circuit is constructed of the diodes 1a-1f, and is therefore simple in arrangement. Since, however, currents flowing through the A.C. power source contain higher harmonics of low orders of the fifth order, the seventh order, . . . etc. in considerable amounts, inductive disturbances are caused or the power factor is lowered by the higher harmonics. Therefore, the installed capacity of the power source enlarges disadvantageously.

SUMMARY OF THE INVENTION

This invention has been made in order to solve such problems, and has for its object to provide a control apparatus for an elevator which can operate the elevator at a speed double that in the prior art even when a battery of low voltage is used.

The control apparatus for an elevator according to this invention comprises a converter which applies a voltage double higher than a battery voltage to an inverter during a power failure.

In this invention, when power supply has stopped, the voltage of a battery is applied to the converter to operate the converter as a step up chopper, and to generate the voltage double the battery voltage across both the terminals of a capacitor connected across the output ends of the converter, the generated voltage being applied to the inverter.

DESCRIPTION OF THE PREFERRED EMBODIMENT

Figure 1:
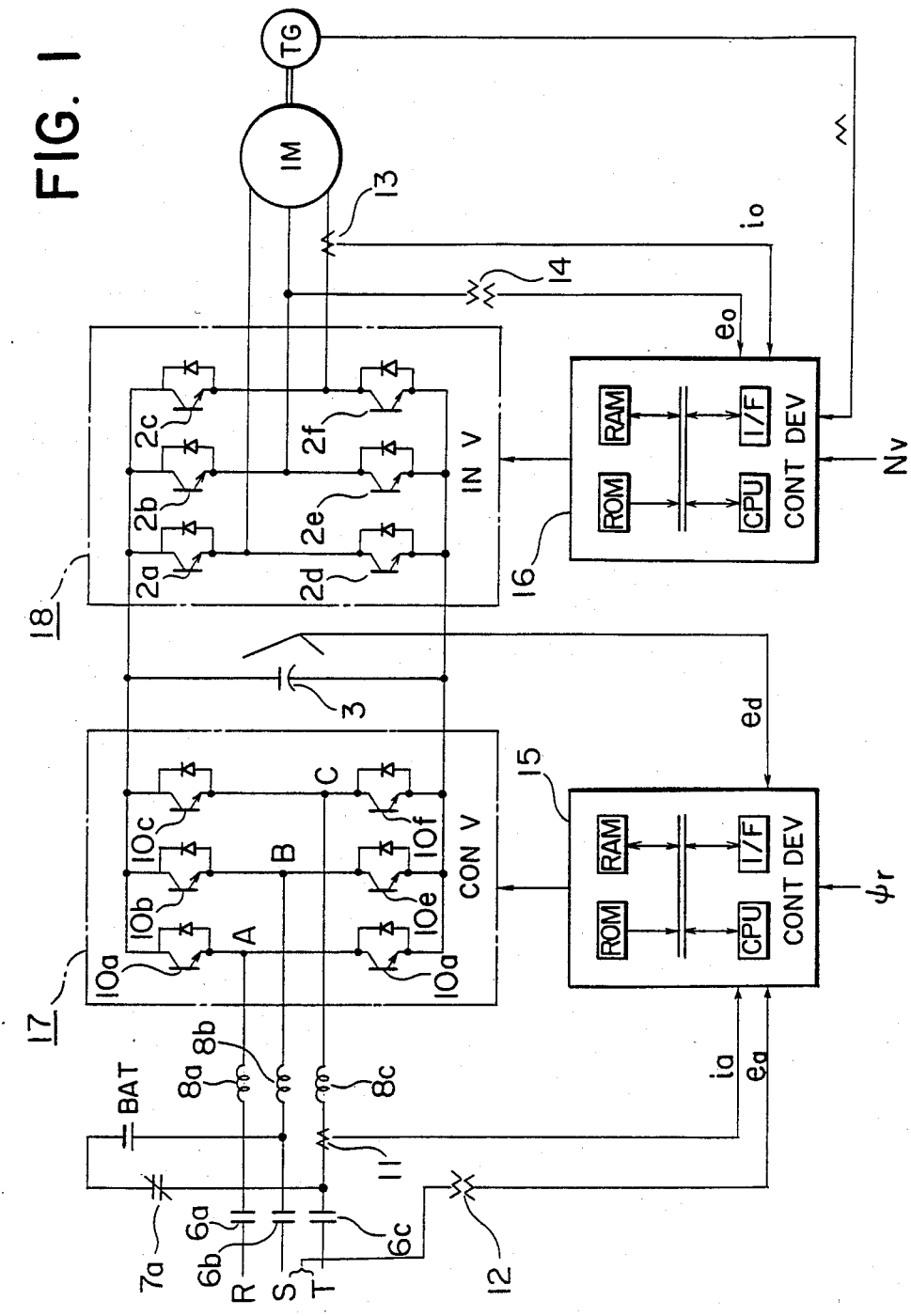
FIG. 1 is a circuit diagram of an embodiment of a control apparatus for an elevator according to this invention.

Now, an embodiment of a control apparatus for an elevator according to this invention will be described with reference to the drawings. FIG. 1 is a circuit diagram showing the arrangement of the embodiment. In the illustration of FIG. 1, the same portions as in FIG. 4 are assigned identical symbols.

A three-phase A.C. power source having phases R, S and T supplies A.C. electric power to the A.C. side input ends A, B and C of a converter 17 through normally-open contacts 6a-6c as well as reactors 8a-8c. The converter 17 is so arranged that power transistors 10a-10f are connected into a three-phase bridge and that diodes are connected in inverse parallel relationship to the corresponding power transistors 10a-10f.

A smoothing capacitor 3 is connected across the plus side output end and minus side output end of the converter 17, and the input ends of an inverter 18 are connected thereto.

Figure 4:
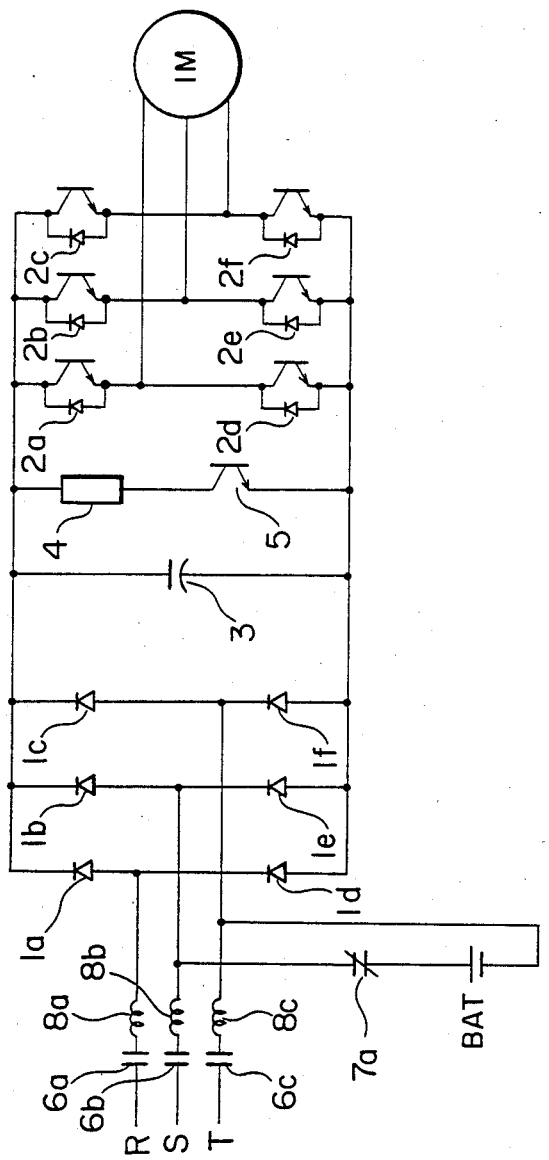
FIG. 4 is a circuit diagram of a prior-art control apparatus for an elevator.

The inverter 18 has an arrangement similar to that of the inverter shown in FIG. 4, in which diodes are connected in inverse parallel relationship to respective power transistors 2a-2f to form a three-phase bridge. The inverter 18 outputs a three-phase alternating current of variable voltage and variable frequency, which is fed to a three-phase A.C. motor IM.

Meanwhile, a series circuit consisting of a normally-closed contact 7a and a battery BAT is connected across the A.C. side input ends B and C of the converter 17 through the reactors 8b and 8c.

In addition, a current transformer 11 is inserted between the normally-open contact 6c and the reactor 8c. The A.C. side current $i_a$ of the converter 17 is input to a control device 15 by this current transformer 11.

Further, the A.C. side voltage $e_a$ of the converter 17 is applied to the control device 15 from a point between S-phase and T-phase of the three phase A.C. power source and through a voltage transformer 12.

The control device 15 is a control device employing a microprocessor, in which a ROM, a RAM, a CPU, an I/F (interface), etc. are included. The control device 15 is also supplied with the terminal voltage of the capacitor 3, namely, the output voltage $e_d$ of the converter 17 detected, and with a phase command value $\psi_r$.

Upon receiving the A.C. side current $i_a$, the A.C. side voltage $e_a$ and the output voltage $e_d$ and on the basis of the phase command value $\psi_r$, the control device 15 controls the phases of the PWM-controlled input voltages on the A.C. side of the converter 17 so as to make the inflow currents of the converter inphase with the supply voltages.

In addition, the output current $i_o$ of the inverter 18 is detected by a current transformer 13 and is input to a control device 16, while the output voltage $e_o$ of the inverter 18 is detected by a voltage transformer 14 and is also input to the control device 16.

Further, a tachometer generator TG is coupled to the three-phase A.C. motor IM, and the rotational speed n of the three-phase A.C. motor IM is detected and input to the control device 16 by this tachometer generator TG.

Likewise to the control device 15, the control device 16 employs a microprocessor and has a ROM, a RAM, a CPU and an I/F. Upon receiving the output current $i_o$, the output voltage $e_o$ and the rotational speed n and on the basis of a control command $N_v$, the control device 16 performs the variable voltage and variable frequency control of the inverter 18. The operation of this inverter 18 is similar to that in the case of FIG. 4.

Since the regeneration of electric power is possible in the case of FIG. 1, the regenerative power processing circuit composed of the resistor 4 and the transistor 5 shown in FIG. 4 is omitted.

Next, the operation of the embodiment will be described. While the three-phase A.C. power source having the phases R, S and T is normal, the normally-open contacts 6a-6c are closed, and the normally-closed contact 7a is open. The phase voltages R, S and T of the three-phase A.C. power source are applied to the A.C. side input ends A-C of the converter 17 through the normally-open contacts 6a-6c as well as the reactors 8a-8c, and are rectified by the converter 17. The resulting D.C. power is smoothed by the capacitor 3, and is supplied to the inverter 18.

The inverter 18 inverts the D.C. power into three-phase A.C. power of variable voltage and variable frequency, which is fed to the three-phase A.C. motor IM. Thus, the three-phase A.C. motor IM is driven to run the cage of the elevator at a predetermined speed.

At this time, the control device 15 receives the A.C. side input current $i_a$ and input voltage $e_a$ of the converter 17 and the D.C. output voltage $e_d$ thereof and controls the phases of the PWM-controlled voltages relative to the supply voltages on the basis of the phase command value $\psi_r$, to make the inflow currents inphase with the supply voltages.

In addition, the control device 16 receives the output current $i_o$ and output voltage $e_o$ of the inverter 18 and the output of the tachometer generator TG, namely, the rotational speed n of the three-phase A.C. motor IM and controls the variable voltage and variable frequency of the inverter 18 on the basis of the control command $N_v$.

On the other hand, when the three-phase A.C. power source having the phases R, S and T has stopped, the normally-open contacts 6a-6c are opened, while at the same time the normally-closed contact 7a is closed. Then, the voltage of the battery BAT is applied across the A.C. side input ends B and C of the converter 17 through the normally-closed contact 7a as well as the reactors 8b and 8c.

Figure 2:
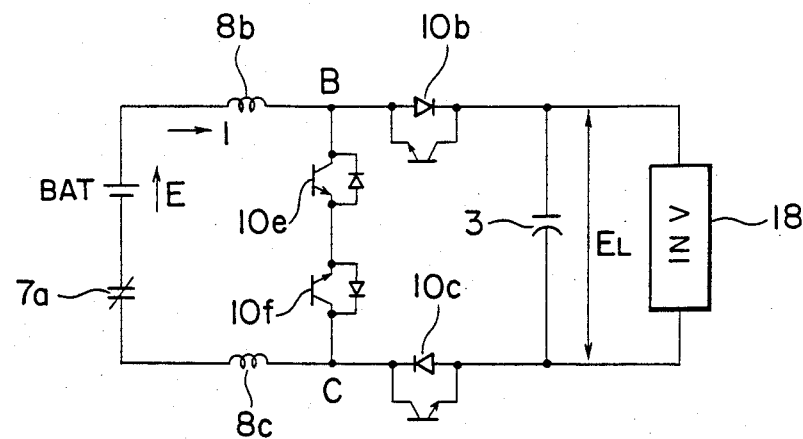
FIG. 2 is a circuit diagram for explaining the operating principle of a step up chopper constructed of a converter in the control apparatus for an elevator.

At this time, the converter 17 does not perform the PWM operation but operates as a chopper. The operating principle of this converter 17 is illustrated in FIG. 2. In the illustration of FIG. 2, the transistor 10e turns "on" and "off" in very fast recurrent operations.

Now, when this transistor 10e has turned "on", energy is stored in the reactors 8b and 8c through the closed loop of the battery BAT—reactor 8b—transistor 10e—transistor 10f—reactor 8c—normally-closed contact 7a—battery BAT.

When the transistor 10e has subsequently turned "off", the energy shifts from the reactors 8b and 8c to the capacitor 3 and the inverter 18 (acting as a load in the arrangement of FIG. 2). When the transistor 10e is turned "on" and "off" rapidly and periodically, the terminal voltage $E_L$ of the capacitor 3 becomes higher than the voltage of the battery BAT.

More specifically, $T_{ON}$ is let denote the period of time during which the transistor 10e turns "on", and $T_{OFF}$ the period of time during which it turns "off". It is assumed that the capacities of the reactors 8b and 8c and the capacitor 3 are large enough to neglect the pulsations of the voltage E of the battery BAT and the terminal voltage $E_L$ of the capacitor 3.

First, the energy which is stored in the reactors 8b and 8c during the "on" period of the transistor 10e is expressed by $E \cdot I \cdot T_{ON}$. Here, letter I denotes the current which flows through the reactors 8b and 8c.

Secondly, the energy which shifts from the reactors 8b and 8c to the capacitor 3 and the inverter 18 during the "off" period of the transistor 10e is expressed by $(E_L - E) \cdot I \cdot T_{OFF}$. On this occasion, energy of $E \cdot I \cdot T_{OFF}$ is simultaneously supplied from the battery BAT to the inverter 18 and the capacitor 3. Therefore, $$E \cdot I \cdot T_{OFF} = (E_L - E) \cdot I \cdot T_{OFF} \tag{1}$$

$$E_L = E(T_{ON} + T_{OFF})/T_{OFF} = E \cdot T/T_{OFF} \tag{2}$$

It is understood from Eq. (2) that $T/T_{OFF}=2$ holds for $T_{ON}=T_{OFF}$, and that the terminal voltage $E_L$ of the capacitor 3 rises to double the voltage E of the battery BAT. When the converter 17 is used in such a manner, it is called the "step up chopper".

Figure 3:
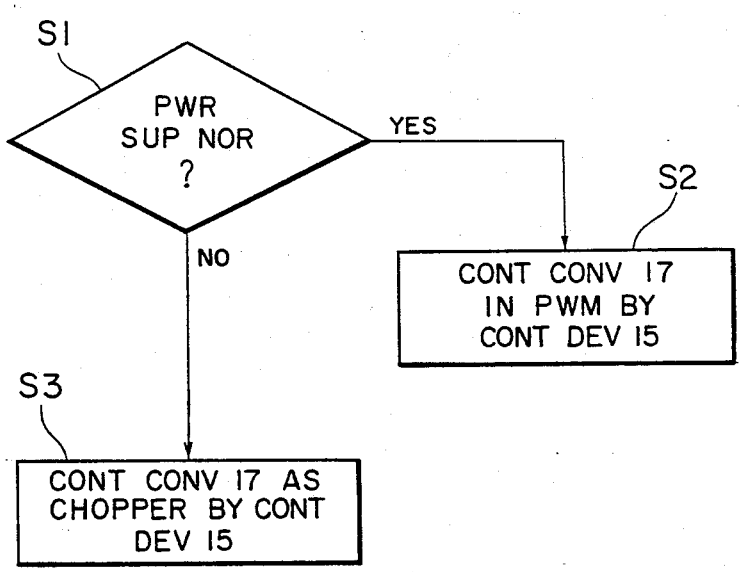
FIG. 3 is a flow chart of control modes for the converter in the control apparatus for an elevator.

FIG. 3 shows a flow chart of the control modes of the converter 17 by the control device 15. If the three-phase A.C. power source R, S, T is normal at a step S1, the converter 17 is PWM-controlled by the control device 15 at a step S2.

On the other hand, if the failure of the three-phase A.C. power source R, S, T is decided at the step S1, the converter 17 is chopper-controlled by the control device 15 at a step S3.

Such an operation of the PWM control or the chopper control by the control device 15 is executed using the CPU and the ROM (in which a program is stored) within the control device 15.

As described above, this invention consists in that a converter is operated as a step up chopper during the stoppage of A.C. power supply. Therefore, current to flow through the A.C. side of the converter can be made substantially sinusoidal with the power factor held near 1 (one), and a D.C. voltage to enter an inverter can be raised to approximately double the highest battery voltage.

Accordingly, the cage of an elevator can be run at a speed double higher than in the prior art even when a battery of low voltage is used.

What is claimed is:

1. A control apparatus for an elevator comprising a converter which converts electric power of an A.C. power source in a normal state into direct current while the A.C. power source is normal and which has a battery connected thereto and operates as a step- up chopper when the A.C. power source stops, a capacitor which smooths the output of said converter during the normal state of the A.C. power source and which is charged to a voltage double that of the battery during the stoppage of the A.C. power source, an inverter which receives the voltage of said capacitor to invert it into alternating current of variable voltage and variable frequency and which supplies the alternating current to an electric motor for driving the cage of the elevator, and a control device which controls said converter in pulse width modulation during the normal state of the A.C. power source and controls it as the chopper during the stoppage of the A.C. power source.

2. A control apparatus for an elevator according to claim 1 wherein reactors are inserted between said converter and the A.C. power source, and the battery is connected to said converter through said reactors during the stoppage of the A.C. power source.

3. A control apparatus for an elevator according to claim 2 wherein said converter is so arranged that a plurality of transistors are connected into a bridge corresponding to a number of phases of the A.C. power source, and that the respective transistors have diodes connected thereto in inverse parallel relationship.

4. A control apparatus for an elevator according to claim 3 wherein said control device performs a control of turning "on" and "off" one of said plurality of transistors, connected to the battery, at a predetermined period and rapidly during the stoppage of the A.C. power source.

5. A control apparatus for an elevator according to claim 4 wherein said control device performs the on-off control of the selected transistor so as to equalize lengths of a turnon period of time and a turnoff period of time of said transistor.

6. A control apparatus for an elevator according to claim 4 wherein electrical energy is stored in said reactors while the selected transistor turns "on", and the energy stored in said reactors is supplied to said capacitor while said transistor turns "off".

* * * * *